United States Patent Office 3,504,051
Patented Mar. 31, 1970

3,504,051
CASTABLE SILOXANE BLOCK COPOLYMERS
Donald E. McVannel, Hemlock, Mich., assignor to Dow Corning Corporation, Midland, Mich., a corporation of Michigan
No Drawing. Filed July 24, 1967, Ser. No. 655,268
Int. Cl. C08g 47/06
U.S. Cl. 260—825          5 Claims

ABSTRACT OF THE DISCLOSURE

A castable siloxane block copolymer, curable at room temperature and useful to make molded elastomeric products, coat fabric and encase electrical equipment is composed of a block copolymer of diorganosiloxane blocks of 100 to 1000 units of $$R_nSiO_{\frac{4-n}{2}}$$

where $n$ is 1.90 to 2.00 and R is methyl, phenyl and vinyl, 90 mol percent being $(CH_3)_2SiO$ units and siloxane blocks of units of $$(CH_3CH_2O)_mSiO_{\frac{4-m}{2}}$$

where $m$ is 0.5–2.00 and the diorganosiloxane blocks are present in an amount of 50 to 95 mol percent.

---

This invention relates to a siloxane block copolymer which cures at room temperature and is castable.

An object of this invention is to provide a castable siloxane block copolymer. Another object of this invention is to provide a room temperature vulcanizable siloxane block copolymer. Other objects and advantages will become apparent from the following detailed description.

This invention relates to a castable siloxane block copolymer consisting essentially of (A) Blocks of siloxane units of the unit formula $$R_nSiO_{\frac{4-n}{2}}$$

in which R is a monovalent radical selected from the group consisting of methyl, vinyl and phenyl radicals, $n$ has an average value from 1.90 to 2.00 inclusive, and said blocks containing at least 90 mol percent dimethylsiloxane units and having an average from 100 to 1000 siloxane units per block, and (B) Blocks of siloxane units of the average unit formula $$(CH_3CH_2O)_mSiO_{\frac{4-m}{2}}$$

in which $m$ has an average value from 0.5 to 2.00 inclusive, and said blocks (A) being present in amount of 50 to 95 mol percent based on total mols of (A) and (B), and blocks (B) being present in an amount of 5 to 50 mol percent based on the total mols of (A) and (B).

The siloxane blocks (A) are composed of an average from 100 to 1000 units of the formula $$R_nSiO_{\frac{4-n}{2}}$$

where R is a methyl, phenyl or vinyl radical. The siloxane blocks (A) contain at least 90 mole percent dimethylsiloxane units. Other units such as phenylmethylsiloxane, monomethylsiloxane, diphenylsiloxane, methylvinylsiloxane, monovinylsiloxane or phenylsiloxane can be present in up to 10 mol percent preferably up to 2 mol percent. The siloxane blocks can have values of $n$ from 1.90 to 2.00 inclusive, preferably from 1.98 to 2.00 inclusive. The siloxane blocks preferably contain from 200 to 700 siloxane units per block.

The siloxane blocks (B) are composed of units of the formula $$(CH_3CH_2O)_mSiO_{\frac{4-m}{2}}$$

where $m$ has an average value from 0.50 to 2.00 inclusive, preferably from 1.00 to 2.00 inclusive. There should be at least three units of (B) per block and preferably at least 10 units of (B) per block.

The amount of siloxane blocks, (A), is from 50 to 95 mol percent, preferably from 50 to 80 mol percent. A mol of siloxane, either (A) or (B), is the formula weight of a siloxane unit. The amount of siloxane blocks, (B), is from 5 to 50 mol percent and preferably from 20 to 50 mol percent. The mol percents are based on the total number of moles of (A) and (B) present in the siloxane block copolymer.

The castable siloxane block copolymer is prepared by mixing in an organic solvent a hydroxylated polyorganosiloxane having a unit formula of $$R_nSiO_{\frac{4-n}{2}}$$

where R and $n$ are defined above, and having an average from 100 to 1000 siloxane units per molecule and an ethylpolysilicate having from 30 to 70 weight percent ethoxy radicals, heating the mixture in the presence of a catalyst selected from the group consisting of potassium acetate and potassium carbonate for 0.5 to 10 hours at a temperature from 60° C. to the reflux temperature of the mixture, said catalyst being present in an amount from one molecule of catalyst per 5000 silicon atoms to one molecule of catalyst per 500 silicon atoms, and said hydroxylated polyorganosiloxane being present in an amount from 50 to 95 mol percent based on the mols of hydroxylated polyorganosiloxane and ethylpolysilicate.

Organic solvents conventionally used with organosiloxanes such as toluene, benzene, xylene, ethers and esters can be used. Toulene and xylene are preferred.

The hydroxylated polyorganosiloxanes and ethylpolysilicates are well known in the art and can be purchased commercially.

The catalyst can be potassium acetate or potassium carbonate. The catalyst is preferably potassium acetate. The catalyst is present in an amount of from one molecule of catalyst per 5000 silicon atoms to one molecule of catalyst per 500 silicon atoms, preferably the catalyst is present in an amount from one molecule of catalyst per 3000 silicon atoms to one molecule of catalyst per 1000 silicon atoms.

The reaction can be conducted at temperatures from 60° C. up to the reflux temperature of the system, preferably the reflux temperature is used. The reaction is carried to completion which requires from 0.5 to 10 hours, preferably from 1 to 5 hours.

The siloxane block copolymer can be used without further processing, although when inorganic salts are used it is preferable to filter the salts from the product solution. A solvent solution of the siloxane block copolymer can be used to coat paper, fabric and electrical articles. However, it is preferred to remove the solvent from the siloxane block copolymer to provide a castable, room temperature vulcanizable fluid. The solvent can be removed by any conventional means, such as milling on a hot mill, vacuum or vacuum with heating.

The castable, room temperature vulcanizable siloxane block copolymer can be cured by exposure to moisture in the presence of a silanol-alkoxy condensation catalyst. The silanol-alkoxy condensation catalyst are well known in the art. Examples of such catalysts are organic titanates and zirconates, organotin salts of carboxylic acids, amines and titanium salts. Other silanol-alkoxy condensation catalysts can be found in U.S. Patent No. 3,308,203.

The castable siloxane block copolymers can be used to mold elastomeric products, encase electrical equipment, and coat fabric. Other uses are apparent to those skilled in the art. The castable, room temperature vulcanizable siloxane block copolymers provide high tensile materials up to 1200 p.s.i. The copolymers with a viscosity of less than 5000 cs. at 25° C. can readily be cured to high strength products; they cure rapidly and have low tension set. The preparation of these castable siloxane block copolymers is easy and economical.

The following examples are illustrative only and should not be construed as limiting the present invention which is properly delineated in the appended claims.

EXAMPLE 1

A three-liter, three necked flask equipped with a stirrer, thermometer and reflux condenser with Dean Stark trap was charged with 200 g. (27 mol percent) of ethylpolysilicate having an ethoxy content of 67 weight percent, 300 g. (73 mol percent) of hydroxyl endblocked polydimethylsiloxane having a viscosity of 2400 cs. at 25° C. and an average of 317 silicon atoms per molecule, 1165 g. of purified toluene and 0.282 g. of potassium acetate. The mixture was refluxed and stirred for 5 hours, then cooled, carbonated with solid $CO_2$ and filtered through diatomaceous earth. The filtered product was devolatilized by using reduced pressure at 75° C. The product was a fluid block copolymer of the polydimethylsiloxane and the ethylpolysilicate. 100 parts by weight of this block copolymer were catalyzed with one part by weight of a mixture of 10 parts by volume dibutyltin dilaurate and 1 part by volume n-hexylamine, then molded and allowed to vulcanize at room temperature. The results after several time periods are indicated in the following table:

| Days at room temperature | Tensile strength, p.s.i. | Percent elongation at break |
|---|---|---|
| 7 | 1,030 | 120 |
| 14 | 1,130 | 125 |
| 21 | 1,070 | 112 |
| 35 | 1,090 | 108 |
| 63 | 1,000 | 92 |
| 77 | 1,090 | 104 |
| 90 | 1,000 | 87 |
| 104 | 1,050 | 103 |

The durometer on the Shore scale was 69 after 90 days at room temperature.

EXAMPLE 2

Each of the following runs were made by mixing the ingredients in a one-liter, three necked flask equipped with a stirrer, thermometer and reflux condenser with a Dean Stark trap. The mixtures were refluxed for 1.5 hours, cooled, carbonated with solid $CO_2$ and filtered through diatomaceous earth. The filtered product was devolatilized by heating at 125° C. and then using reduced pressure to remove the traces of volatiles.

The ingredients were:

(A) 60 g. (67 mol percent) of polydimethylsiloxane having a viscosity of 2250 cps. at 25° C. and an average of 310 silicon atoms per molecule, 54 g. (33 mol percent) of ethylpolysilicate having 67 weight percent ethoxy, 342 g. of toluene and 0.0571 g. of potassium acetate.

(B) 60 g. (69 mol percent) of the polydimethylsiloxane of (A) above, 48 g. (31 mol percent) of the ethylpolysilicate of (A) above, 324 g. of toluene and 0.0553 g. of potassium acetate.

(C) 60 g. (72 mol percent) of the polydimethylsiloxane of (A) above, 42 g. (28 mol percent) of the ethylpolysilicate of (A) above, 306 g. of toluene and 0.0533 g. of potassium acetate.

(D) 80 g. (75 mol percent) of the polydimethylsiloxane of (A) above, 48 g. (25 mol percent) of the ethylpolysilicate of (A) above, 384 g. of toluene and 0.0683 g. of potassium acetate.

(E) 80 g. (78 mol percent) of the polydimethylsiloxane of (A) above, 40 g. (22 mol percent) of the ethylpolysilicate of (A) above, 360 g. of toluene and 0.0658 g. of potassium acetate.

The block copolymers obtained above had the following viscosities (cs.) as measured at 25° C. and the indicated r.p.m.

| Block copolymer | 10 rpm. | 50 rpm. | 100 rpm. |
|---|---|---|---|
| A | 1,750 | 1,450 | 1,200 |
| B | 2,600 | 2,200 | 1,850 |
| C | 1,450 | 1,400 | 1,250 |
| D | 1,600 | 1,200 | 1,000 |
| E | 1,450 | 1,450 | 1,300 |

Samples of 9.33 g. of each of the above block copolymers was mixed with 4 drops of the same catalyst as described in Example 1 and each mixture was allowed to cure at room temperature in a 2" x 3½" chase which was lined with polyethylene.

The following properties were obtained:

| Block copolymer | A | B | C | D | E |
|---|---|---|---|---|---|
| 1 day at room temperature: | | | | | |
| Durometer, Shore A | 67 | 65 | 49 | 61 | |
| Tensile strength, p.s.i. | 785 | 790 | 700 | 725 | 765 |
| Elongation at break, percent | 90 | 90 | 100 | 105 | 120 |
| 7 days at room temperature: | | | | | |
| Durometer, Shore A | 70 | 68 | 52 | 49 | |
| Tensile strength, p.s.i. | 900 | 840 | 1,040 | 1,000 | 880 |
| Elongation at break, percent | 90 | 90 | 110 | 110 | 110 |
| 21 days at room temperature: | | | | | |
| Tensile strength, p.s.i. | 1,130 | 1,010 | 1,030 | 890 | 910 |
| Elongation at break, percent | 105 | 103 | 113 | 110 | 118 |

EXAMPLE 3

A one-liter, three necked flask was charged with 80 g. (36 mol percent) of the ethylpolysilicate of Example 1, 80 g. (64 mol percent) of the dimethylpolysiloxane of Example 2(A), 480 g. of purified toluene and 0.0788 g. of potassium acetate. The mixture was refluxed for 1.5 hours, cooled, carbonated with solid $CO_2$ and then filtered through diatomaceous earth. The filtrate was divided into four portions A, B, C and D. Each portion was devolatilized by using heat and reduced pressure. The maximum stripping temperature obtained in each case was as follows:

| | °C. |
|---|---|
| A | 75 |
| B | 100 |
| C | 125 |
| D | 150 |

Each of the block copolymers obtained were catalyzed and cured as described in Example 2. After 11 days at room temperature, the following results were obtained.

| Block copolymer | A | B | C | D |
|---|---|---|---|---|
| Durometer, Shore A | 77 | 76 | 76 | 75 |
| Tensile strength, p.s.i. | 1,170 | 1,170 | 1,100 | 1,010 |
| Elongation, percent | 74 | 71 | 67 | 71 |

EXAMPLE 4

The process of Example 3 was repeated except xylene was substituted for the toluene, the mixture was refluxed for 3 hours and the block copolymer filtrate was stripped to a temperature of 140° C. A sample of the block copolymer was cured as in Example 3 and the results are as follows:

|  | 4 days | 11 days |
|---|---|---|
| Tensile strength, p.s.i. | 810 | 940 |
| Elongation, percent | 62 | 67 |

EXAMPLE 5

When the following diorganopolysiloxanes and ethylpolysilicates are used to prepare block copolymers by the procedure described in Example 1, equivalent results are obtained.

(A) 75.2 g. (50 mol percent) of a diorganopolysiloxane having 90 mol percent dimethylsiloxane units and 10 mol percent methylvinylsiloxane units and having an average of 200 siloxane units per molecule, 136 g. (50 mol percent) of the ethylpolysilicate described in Example 1.

(B) 304 g. (80 mol percent) of a diorganopolysiloxane having 90 mol percent dimethylsiloxane units, 5 mol percent monomethylsiloxane units and 5 mol percent monophenylsiloxane units and having an average of 100 siloxane units per molecule, and 136 g. (20 mol percent) of the ethylpolysilicate described in Example 1.

(C) 666 g. (90 mol percent) of dimethylpolysiloxane having an average of 510 dimethylsiloxane units per molecule, 126.6 g. (10 mol percent) of ethylpolysilicate having 64 weight percent ethoxy groups.

(D) 726.7 g. (95 mol percent) of a diorganopolysiloxane having 95 mol percent dimethylsiloxane units, 1 mol percent methylvinylsiloxane units and 4 mol percent phenylmethylsiloxane units and having an average of 350 siloxane units per molecule, and 48.5 g. (5 mol percent) of ethylpolysilicate having 46.5 weight percent ethoxy groups.

(E) 614 g. (83 mol percent) of a dimethylpolysiloxane having 2 mol percent monomethylsiloxane units and 98 mol percent dimethylsiloxane units and having an average of 1000 siloxane units per molecule and 133.5 g. (17 mol percent) of ethylpolysilicate having 30 weight percent ethoxy groups.

(F) 436.6 g. (59 mol percent) of dimethylpolysiloxane having an average of 700 siloxane units per molecule and 481.8 g. (41 mol percent) of ethylpolysilicate having 60 weight percent ethoxy groups.

That which is claimed is:

1. A castable siloxane block copolymer consisting essentially of (A) blocks of siloxane units of the unit formula $$R_nSiO_{\frac{4-n}{2}}$$

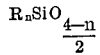

in which R is a monovalent radical selected from the group consisting of methyl, vinyl and phenyl radicals and $n$ has an average value from 1.90 to 2.00 inclusive, said blocks containing at least 90 mol percent dimethylsiloxane units and having an average from 100 to 1000 siloxane units per block, and (B) blocks of siloxane units of the average unit formula $$(CH_3CH_2)O)_mSiO_{\frac{4-m}{2}}$$

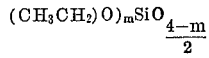

in which $m$ has an average value from 0.5 to 2.00 inclusive, said blocks (A) being present in an amount of 50 to 95 mol percent based on the total mols of (A) and (B), and blocks (B) being present in an amount of 5 to 50 mol percent based on the total mols of (A) and (B).

2. The castable siloxane block copolymer according to claim 1, wherein R is methyl and (A) has an average of 200 to 700 dimethylsiloxane unit per block.

3. The castable siloxane block copolymer according to claim 2, wherein $n$ has an average value from 1.98 to 2.00 inclusive and $m$ has an average value from 1.00 to 2.00 inclusive.

4. The castable siloxane block polymer according to claim 1, wherein blocks (A) are present in an amount of 50 to 80 mol percent based on the total mols of (A) and (B), and blocks (B) are present in an amount of 20 to 50 mol percent based on the total mols of (A) and (B).

5. The castable siloxane block copolymer according to claim 3, wherein blocks (A) are present in an amount of 50 to 80 mol percent based on the total mols of (A) and (B), and blocks (B) are present in an amount of 20 to 50 mol percent based on the total mols of (A) and (B).

References Cited

UNITED STATES PATENTS

| 2,698,314 | 12/1954 | Rust | 260—825 |
| 2,985,546 | 5/1961 | Leavitt | 260—825 |
| 3,127,363 | 3/1964 | Nitzsche et al. | 260—18 |
| 3,308,203 | 3/1967 | Metevia et al. | 260—825 |

SAMUEL H. BLECH, Primary Examiner

U.S. Cl. X.R.

117—155, 161; 260—18, 33.6